(12) United States Patent
Hendriks

(10) Patent No.: US 7,821,167 B2
(45) Date of Patent: Oct. 26, 2010

(54) METHOD AND APPARATUS FOR INCREASING THE BUFFER VOLUME IN A FLUID DYNAMIC BEARING

(75) Inventor: Ferdinand Hendriks, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 716 days.

(21) Appl. No.: 11/502,246

(22) Filed: Aug. 9, 2006

(65) Prior Publication Data
US 2008/0037917 A1 Feb. 14, 2008

(51) Int. Cl.
*H02K 5/16* (2006.01)

(52) U.S. Cl. .................. 310/90; 384/107; 384/112; 360/99.08

(58) Field of Classification Search .............. 310/90; 384/12, 7; 360/99.08
See application file for complete search history.

(56) References Cited

U.S. PATENT DOCUMENTS

| | | | | | |
|---|---|---|---|---|---|
| 5,980,113 | A | * | 11/1999 | Grantz | 384/108 |
| 6,066,903 | A | * | 5/2000 | Ichiyama | 310/90 |
| 6,307,293 | B1 | * | 10/2001 | Ichiyama | 310/90.5 |
| 6,655,841 | B1 | * | 12/2003 | Heine et al. | 384/110 |
| 6,900,567 | B2 | * | 5/2005 | Aiello et al. | 310/90 |
| 6,962,442 | B2 | * | 11/2005 | Braun | 384/110 |
| 2003/0094868 | A1 | * | 5/2003 | Kronenberg et al. | 310/90 |
| 2005/0200216 | A1 | * | 9/2005 | Brown | 310/90 |
| 2006/0291757 | A1 | * | 12/2006 | LeBlanc et al. | 384/107 |
| 2007/0145837 | A1 | * | 6/2007 | Herndon et al. | 310/67 R |
| 2007/0292058 | A1 | * | 12/2007 | Hendriks et al. | 384/100 |

FOREIGN PATENT DOCUMENTS

JP 2005-351421 * 12/2005

\* cited by examiner

*Primary Examiner*—Quyen Leung
*Assistant Examiner*—Terrance Kenerly

(57) ABSTRACT

An apparatus and method for increasing the buffer volume in a fluid dynamic bearing is disclosed. One embodiment provides a thrust washer coupled with a shaft of a fluid dynamic bearing. In addition, at least one groove is provided on an outward facing side of the thrust washer. In so doing, the at least one groove increases a fluid capacity of the capillary buffer of the fluid dynamic bearing without requiring a change in the size or shape of a capillary buffer of the fluid dynamic bearing.

17 Claims, 5 Drawing Sheets

350

355

METHOD AND APPARATUS FOR INCREASING THE BUFFER VOLUME IN A FLUID DYNAMIC BEARING

TECHNICAL FIELD

The present invention relates to the field of hard disk drive development, and more particularly to a method and system for utilizing an interlocking dissimilar metal component in the formation of a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a hard storage disk that spins at a standard rotational speed. An actuator moves a magnetic read/write head over the disk. The actuator arm carries a head gimbal assembly (HGA) that includes a slider and a suspension with a nose portion for directly contacting a ramp used during the load and unload cycles for a load/unload drive. The slider carries a head assembly that includes a magnetic read/write transducer or head for reading/writing information to or from any desired location on the disk.

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Areal densities of hard disk drives (HDD) in the past have increased at significant rates of 60 percent to more than 100 percent per year. This trend has slowed more recently to approximately 40 percent per year due to technology challenges. Areal densities today are close to 100 Gb/in2. HDDs are being used more often as digital applications in the consumer electronics industry proliferates, requiring much higher capacities and setting new expectation for lower acoustics. All of the above makes fluid dynamic bearing spindle motors attractive for minimizing non repeatable runout (NRRO), lowering acoustical noise, and improving reliability.

Presently, ball bearing (BB) spindle motors comprise a significant number of shipments in hard disk drives. However, a transition to fluid dynamic bearings (FDB) is occurring in the HDD industry. The trend of incorporating FDB motors in HDD designs is a direct result of higher areal densities and much faster spindle speeds being achieved for today's applications. NRRO is the highest contributor to track mis-registration (TMR), thus impacting HDD performance. NRRO is also an inhibitor in achieving higher track densities. Ball bearing motors produce larger NRRO due to the mechanical contact with the inherent defects found in the geometry of the race ball interface and the lubricant film. Ball bearing spindle motors have minimized this issue with tighter tolerances and closer inspections. There is an upper limit beyond which the ball bearing design can no longer overcome the NRRO problem at the higher areal densities. Currently with ball bearings, NRRO has settled in the 0.1 micro-inch range.

By contrast, FDBs generate less NRRO due to absence of contact between the sleeve and stator. FDB designs are expected to limit NRRO in the range of 0.01 micro-inch. Other inherent properties of the FDB design are higher damping, reduced resonance, better non-operational shock resistance, greater speed control, and improved acoustics. Non-operational shock improvement is a result of a much larger area of surface-to-surface contact. Noise levels are reduced to approximately 20 dBA, since there is no contributing noise from ball bearings.

However, one problem with FDB is the loss of the lubrication or fluid within the bearing. As fluid is lost, the remaining fluid in the FDB bearing will retain more heat, have a larger concentration of sediment, provide reduced friction protection and generally impair FDB operation. Moreover, the loss of fluid enhances the problem resulting in additional fluid loss due to the heat build up induced evaporation, while the increased sediment concentration will increase wear. In other words, once the fluid loss begins, the time to catastrophic failure is significantly reduced.

Presently, the FDB can lose a significant amount of fluid from the capillary buffer via evaporation and atomization of the fluid as well as other operational factors. The loss of the fluid at the FDB will result in initial errors based on increased NRRO and finally seizure of the FDB.

SUMMARY

An apparatus and method for increasing the buffer volume in a fluid dynamic bearing is disclosed. One embodiment provides a thrust washer coupled with a shaft of a fluid dynamic bearing. In addition, at least one groove is provided on an outward facing side of the thrust washer. In so doing, at least one groove increases the fluid capacity of the fluid dynamic bearing without requiring a change in the size or shape of a capillary buffer of the fluid dynamic bearing.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for increasing the buffer volume in a fluid dynamic bearing (FDB) in particular. Although the fluid dynamic bearing is shown in a hard disk drive, it is understood that the embodiments described herein are useful in a fluid dynamic bearing regardless of whether the fluid dynamic bearing is a portion of a hard disk drive. The utilization of the fluid dynamic bearing within the HDD is only one embodiment and is provided herein merely for purposes of brevity and clarity.

In general, embodiments of the present invention provide a method and apparatus for increasing the buffer volume in a fluid dynamic bearing. For example, one problem with traditional fluid dynamic bearing is the loss of the lubrication or fluid within the bearing. As fluid is lost, the remaining fluid in the fluid dynamic bearing will retain more heat and have a larger concentration of sediment. This results in additional fluid loss and further sediment buildup. In other words, once the fluid loss begins, the time to catastrophic failure is significantly reduced. In other words, the fluid dynamic bearing can lose an excessive amount of fluid from the capillary buffer via evaporation and atomization and other operational factors. The loss of excessive amounts of fluid at the fluid dynamic bearing will initially result in errors caused by NRRO and finally seizure of the fluid dynamic bearing.

However, by utilizing the thrust washer implementation described herein, the fluid dynamic bearing reservoir capacity is significantly increased without requiring any modification to the capillary buffer of the fluid dynamic bearing. Therefore, the amount of fluid in the fluid dynamic bearing is significantly increased while the evaporation and atomization properties of the fluid dynamic bearing are not deleteriously affected.

Figure 1:
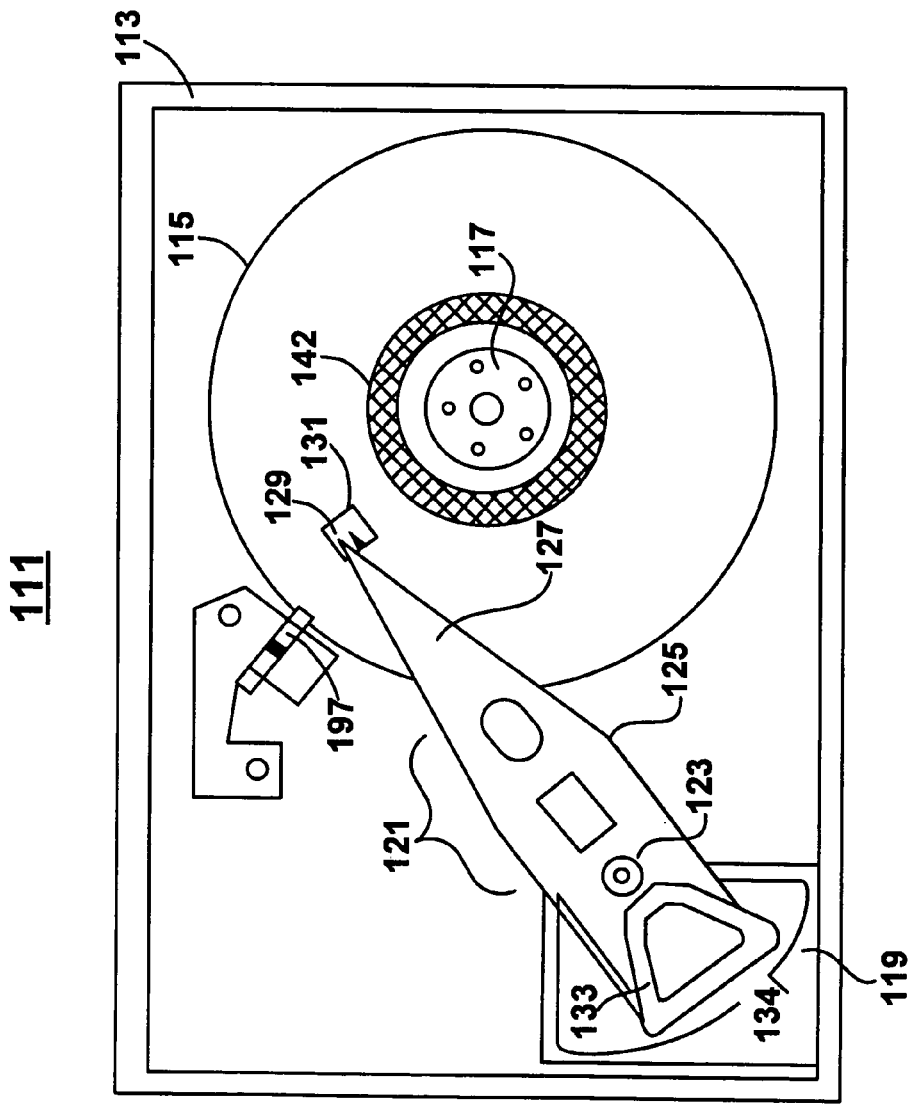
FIG. 1 is a schematic top plan view of a hard disk drive in accordance with one embodiment of the present invention.

With reference now to FIG. 1, a schematic drawing of one embodiment of an information storage system comprising a magnetic hard disk file or drive 111 for a computer system is shown. Although a hard disk drive having a single disk is shown, embodiments of the invention are well suited for utilization on a hard disk drive having a plurality of disks therein. The utilization of the driver of FIG. 1 is merely one of a plurality of hard disk drives that may be utilized in conjunction with the present invention. For example, in one embodiment the hard disk drive 111 would use load/unload (L/UL) techniques with a ramp 197 and a nose limiter. In another embodiment, the drive 111 is a non L/UL drive, for example, a contact start-stop (CSS) drive having a textured landing zone 142 away from the data region of disk 115.

In the exemplary FIG. 1, Drive 111 has an outer housing or base 113 containing a disk pack having at least one media platter or magnetic disk 115. A spindle motor assembly having a central drive hub 117 rotates the disk or disks 115. In one embodiment, the bearing utilized in the central drive hub 117 is a fluid dynamic bearing. An actuator comb 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127. It should be understood that ELS 127 may be, in one embodiment, an integrated lead suspension (ILS) that is formed by a subtractive process. In another embodiment, ELS 127 may be formed by an additive process, such as a circuit integrated suspension (CIS). In yet another embodiment, ELS 127 may be a flex-on suspension (FOS) attached to base metal or it may be a flex gimbal suspension assembly (FGSA) that is attached to a base metal layer. The ELS may be any form of lead suspension that can be used in a data access storage device, such as a HDD. A magnetic read/write transducer 131 or head is mounted on a slider 129 and secured to a flexible structure called "flexure" that is part of ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk as the disk rotates and air bearing develops pressure. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator comb 121 by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

In general, the load/unload drive refers to the operation of the ELS 127 with respect to the operation of the disk drive. That is, when the disk 115 is rotating, the ELS 127 is unloaded from the disk. For example, when the disk drive is not in operation, the ELS 127 is not located above the disk 115 but is instead located in a holding location on L/UL ramp 197 away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the mechanical ship shock robustness of the HDD is greatly increased.

Figure 2:
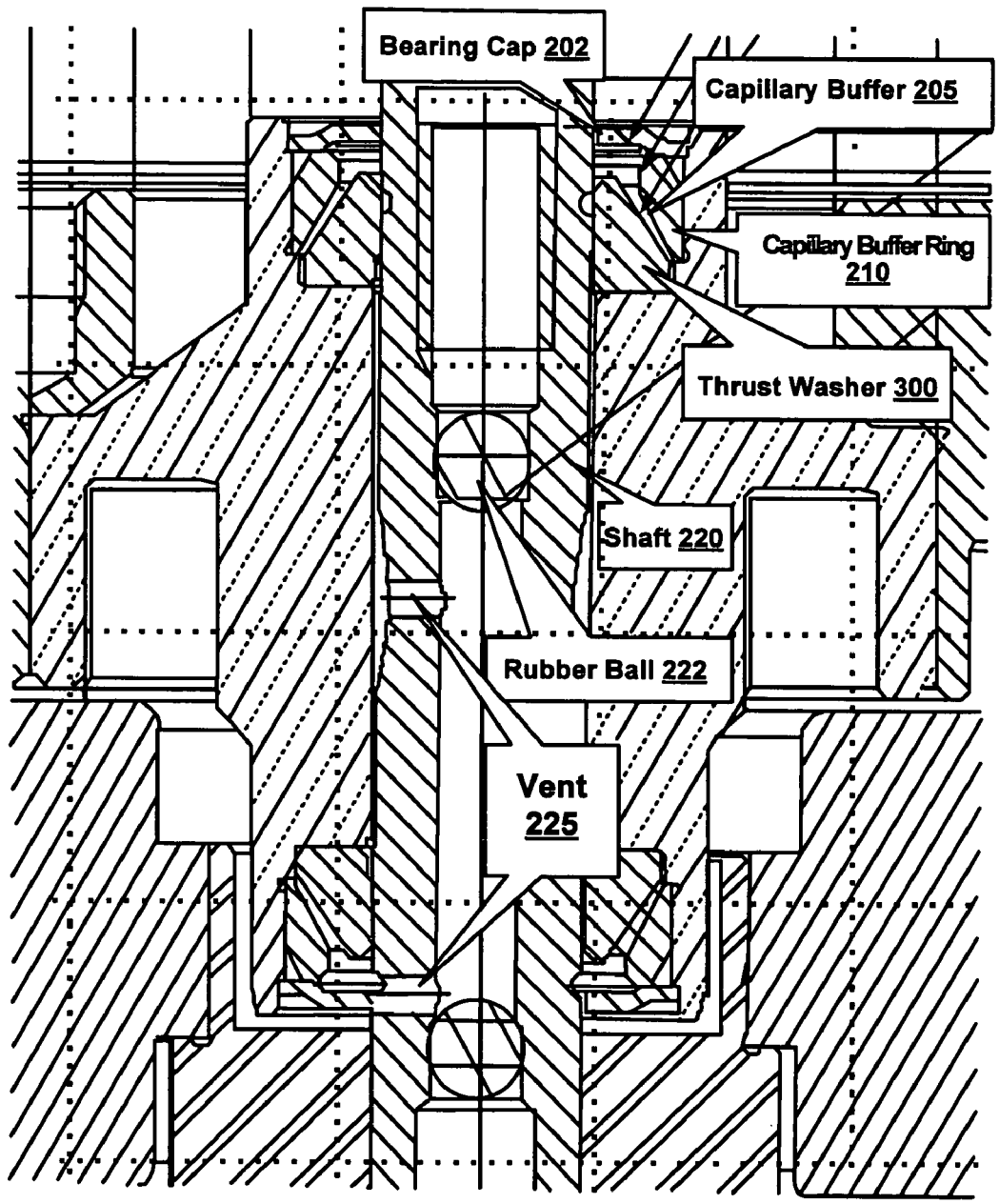
FIG. 2 is an exemplary cross-sectional view of a portion of a fluid dynamic bearing in accordance with one embodiment of the present invention.

With reference now to FIG. 2, a cross-sectional view of a portion of a fluid dynamic bearing 200 is shown in accordance with one embodiment of the present invention. In one exemplary embodiment, the fluid dynamic bearing 200 includes a plurality of components such as a bearing cap 202, a capillary buffer 205, a capillary buffer ring 210 a shaft 220, a rubber ball 222, and a vent 225. The components shown in FIG. 2 are well-known in the art and are not described in greater detail for purposes of brevity and clarity. In one embodiment, the components described in fluid dynamic bearing 200 are mirrored at both ends of the fluid dynamic bearing 200 and are not shown for purposes of brevity and clarity.

Figure 3A:
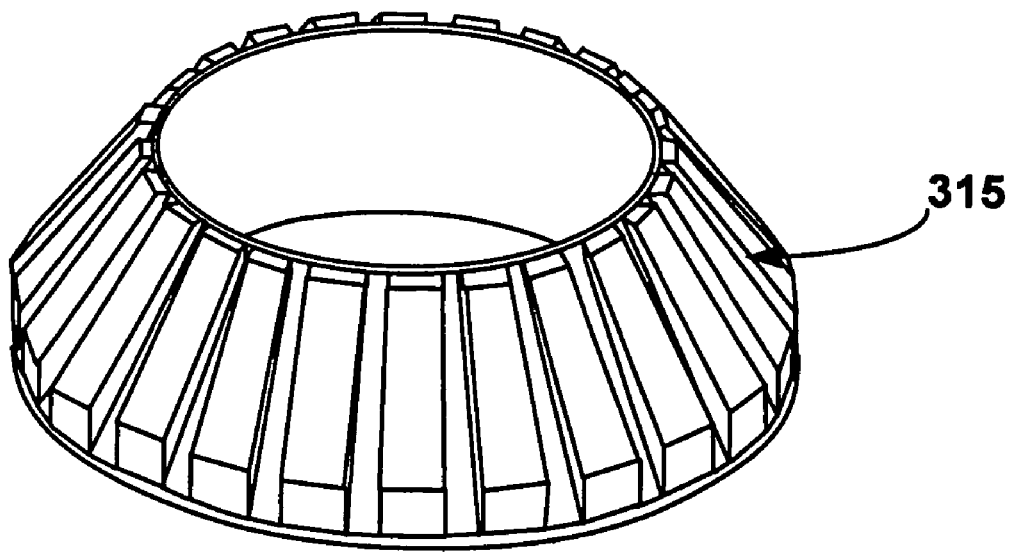
FIG. 3A is an isometric view of an exemplary thrust washer with radial grooves in accordance with one embodiment of the present invention.
Figure 3B:
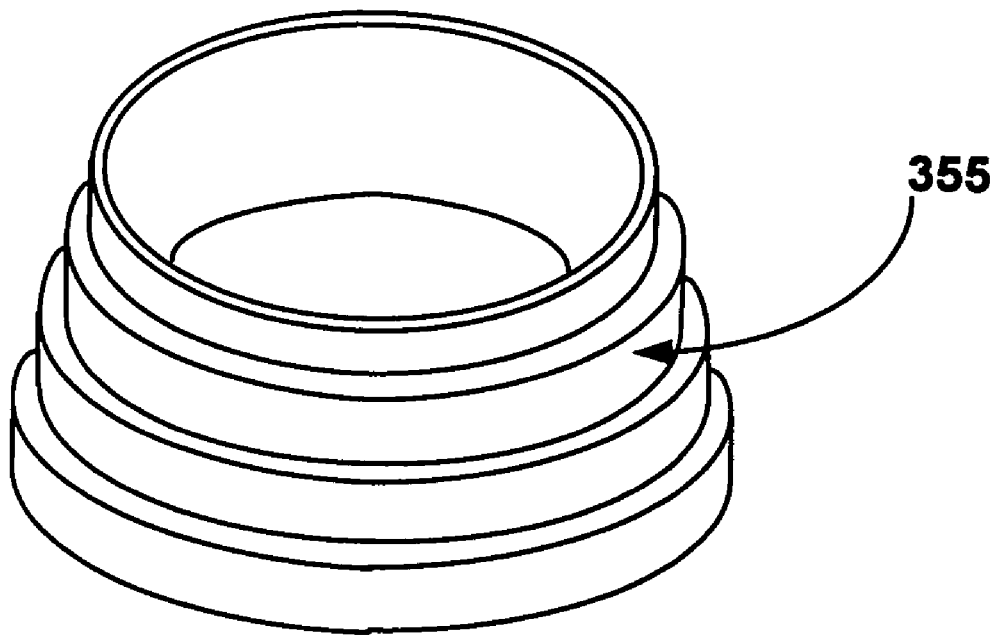
FIG. 3B is an isometric view of an exemplary thrust washer with circumferential grooves in accordance with one embodiment of the present invention.

Referring now to FIG. 3A, an isometric view of an exemplary thrust washer with radial grooves 315 is shown in accordance with one embodiment of the present invention. Referring now to FIG. 3B, an isometric view of an exemplary thrust washer with circumferential grooves 355 is shown in accordance with one embodiment of the present invention. Although two implementations are shown for increasing the reservoir area by providing grooves within the thrust washer, it is understood that the thrust washer grooves may be of a plurality of designs or shapes. For example, the grooves may be formed in a herring bone pattern, a straight pattern, dimples or protuberances, a curved pattern, or utilizing porous openings, indents, patterns, and the like. The examples of FIGS. 3A and 3B are merely for purposes of brevity and clarity.

Figure 4:
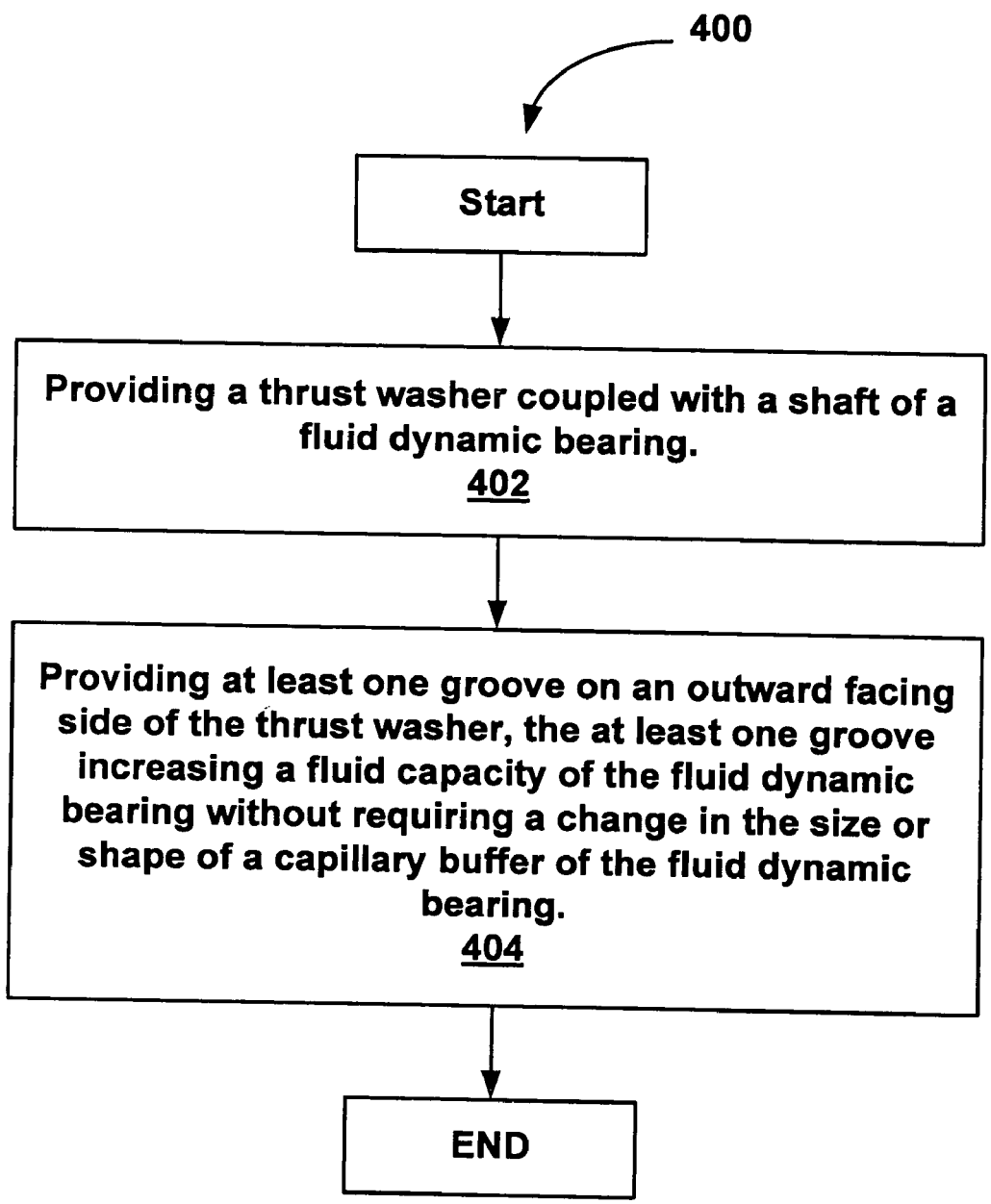
FIG. 4 is a flowchart of a method for increasing the buffer volume in a fluid dynamic bearing in accordance with one embodiment of the present invention.

FIG. 4 is a flowchart of a method for increasing the buffer volume in a fluid dynamic bearing in accordance with one embodiment of the present invention. In general, the fluid dynamic bearing generates less NRRO due to the lack of contact between the sleeve and stator than comparable ball bearing spindle motors. Fluid dynamic bearing designs are expected to limit NRRO in the range of 0.01 micro-inch. Other inherent properties of the fluid dynamic bearing design are higher damping, reduced resonance, better non-operational shock resistance, greater speed control, and improved acoustics. Non-operational shock improvement is a result of a much larger area of surface-to-surface contact. Noise levels are reduced to approximately 20 dBA, since there is no contributing noise from ball bearings.

In addition to server class hard drives and desktop hard drives, mobile hard disk drives also use fluid dynamic bearing motors due to the high areal densities that are being achieved with today's technology. Desktop and mobile HDD track densities today are exceeding 100,000 tracks per inch (100 kTPI), which can compound the issues of NRRO. Incorporating FBD motors in the design of desktop and mobile hard drives solves many of the issues of NRRO.

Fluid Dynamic Bearing motors provide improved acoustics over traditional Ball Bearing spindle motors. The source of acoustic noise in the HDD is the dynamic motion of the disk, actuator and spindle motor components. The sound components are generated from the motor magnet, stator, bearings, and disks. These sound components are all transmitted through the spindle motor to the HDD base casting and top cover. Eliminating the bearing noise by use of fluid dynamic bearing spindle motors reduces one area of the noise component that contributes to acoustic noise. In addition, the damping effect of the lubricant film further attenuates noise contributed from the spindle motor components. This results in lower acoustic noise from HDDs employing fluid dynamic bearing spindle motors. Industry data has shown a 4 dBA or more decrease in idle acoustic noise or some HDD designs.

With reference now to 402 of FIG. 4 and to FIG. 2, one embodiment provides a thrust washer 300 coupled with a shaft 220 of a fluid dynamic bearing 200. In one embodiment, the thrust washer 300 is located near the top of the shaft 220 of the fluid dynamic bearing 200. In another embodiment, the thrust washer 300 is located near the bottom of the shaft 200 of the fluid dynamic bearing 200.

Referring now to 404 of FIG. 4 and to FIGS. 3A and 3B, one embodiment provides at least one groove (e.g., 315 or 355) on an outward facing side of the thrust washer (e.g., 300 or 350), at least one groove (e.g., 315 or 355) increasing the fluid capacity of the fluid dynamic bearing 200 without requiring an increasing of the size or shape of the capillary buffer 205 of the fluid dynamic bearing 200. In other words, the thrust washer 300 has capillary grooves 315 that increase the fluid holding capacity of the capillary buffer 205 of fluid dynamic bearing 200. In one exemplary embodiment, the capillary grooves 315 are 1 mm deep. However, the depth and number of the capillary grooves 315 is also dictated by manufacturing costs, mechanical strength concerns, and the like. The use of 0.1 mm herein is merely for purposes of brevity and clarity. Furthermore, as stated herein, the capillary grooves 315 can be any type of groove pattern that will improve the oil holding capacity of the fluid dynamic bearing 200.

As shown in FIGS. 3A and 3B, in one embodiment, the capillary grooves 315 are a plurality of radial grooves 315 on the thrust washer 300. In another embodiment, the capillary grooves 315 are a plurality of circumferential grooves 355 on the thrust washer.

With reference again to 404 and to FIG. 2, one embodiment provides a plurality of thrust washers 300 coupled to the shaft 220. The plurality of thrust washers 300 having at least one groove thereon. For example, the first of the plurality of thrust washers 300 is coupled to an upper portion of the shaft 220 of the fluid dynamic bearing 200. Additionally, the second of the plurality of thrust washers 300 is coupled to a lower portion of the shaft 220 of the fluid dynamic bearing 200. Although the thrust washers 300 are coupled to the upper portion of the shaft 220 and the lower portion of the shaft 220, the thrust washers 300 may have the same groove patterns or may have different groove patterns. For example, the top thrust washer 300 may have radial grooves 315 while the lower thrust washer 300 will have circumferential grooves 355, or vice versa.

In one embodiment, the capillary grooves 315 also provide a capillary wicking effect on the fluid in the capillary buffer (e.g., reservoir) of the fluid dynamic bearing 200. In general, the capillary wicking effect refers to the retention of the fluid in the reservoir in the fluid dynamic bearing 200. As is well known in the art, the retention of the fluid provides better lubrication, stable viscosity, and longer life to the fluid dynamic bearing 200.

In one embodiment, in addition to the thrust washer 300 having at least one groove thereon, a portion of the capillary buffer ring 210 opposite the thrust washer 300 of the fluid dynamic bearing 200 will also have at least one groove thereon. In one embodiment, at least one groove on the capillary buffer ring 210 will also provide an increase to the fluid capacity of the fluid dynamic bearing 200 without requiring a change in the size or shape of a capillary buffer 205 of the fluid dynamic bearing 200.

In one embodiment, at least one groove on the capillary buffer ring 210 will be a radial groove such as the radial groove 315 of FIG. 3A. In another embodiment, at least one groove on the capillary buffer ring 210 will be a circumferential groove such as the circumferential groove 355 of FIG. 3B. Although two implementations are stated for increasing the reservoir area by providing grooves on the capillary buffer ring 210, it is understood that the capillary buffer ring grooves may be of a plurality of designs or shapes. For example, the grooves may be formed in a herringbone pattern, a straight pattern, dimples or protuberances, a curved pattern, or utilizing porous openings, indents, patterns, and the like. The examples used herein are merely for purposes of brevity and clarity.

In general, the addition of at least one groove to the inside of the capillary buffer ring 205 will not compromise the meniscus stabilizing function of the capillary buffer 205. In one embodiment, the thrust washer 300 will have only a single or very few grooves to avoid weakening of the thrust washer 300 while the addition of at least one groove to the capillary buffer ring 210 will provide the necessary volume increase to the fluid reservoir of the fluid dynamic bearing 200.

Thus, embodiments of the present invention provide a method and apparatus for increasing the buffer volume in a fluid dynamic bearing. Additionally, embodiments described herein, increase the buffer volume without requiring a modification or change in the viscosity of the fluid in the fluid dynamic bearing. Furthermore, embodiments described herein, provide an increase in the buffer volume without modifying the manufacturing or structure of any other components within the fluid dynamic bearing design. Moreover, embodiments described herein, provide an increase in the buffer volume without increasing the taper angles, length, size or shape of the capillary buffer thereby maintaining the non-operating shock values of the fluid dynamic bearing.

What is claimed is:

1. A method for increasing the buffer volume in a fluid dynamic bearing comprising:
   providing a thrust washer coupled with a shaft of a fluid dynamic bearing;
   providing at least one groove on an outward facing side of said thrust washer, said at least one groove increasing a fluid capacity of said fluid dynamic bearing without requiring a change in the size or shape of a capillary buffer of said fluid dynamic bearing;
   providing a capillary buffer ring portion opposite said thrust washer of said fluid dynamic bearing; and
   providing at least one groove on said capillary buffer ring, said at least one groove increasing the fluid capacity of said fluid dynamic bearing without requiring a change in the size or shape of a capillary buffer of said fluid dynamic bearing.

2. The method of claim 1 wherein said at least one groove on said outward facing side of said thrust washer further comprises:
   providing a capillary wicking effect on a fluid in a reservoir of said fluid dynamic bearing, said capillary wicking effect circulating said fluid in said reservoir.

3. The method of claim 2 wherein said at least one groove comprises:
   providing a plurality of radial grooves on said thrust washer.

4. The method of claim 2 wherein said at least one groove comprises:
   providing a plurality of circumferential grooves on said thrust washer.

5. The method of claim 1 wherein said fluid dynamic bearing further comprises:
   providing a plurality of thrust washers coupled to said shaft, said plurality of thrust washers having said at least one groove thereon.

6. The method of claim 5 further comprising:
   coupling a first of said plurality of thrust washers to an upper portion of said shaft of said fluid dynamic bearing; and
   coupling a second of said plurality of thrust washers to a lower portion of said shaft of said fluid dynamic bearing.

7. A hard disk drive comprising:
   a housing;
   a disk pack mounted to the housing and having a plurality of disks that are rotatable relative to the housing, the disk pack defining an axis of rotation and a radial direction relative to the axis;
   an actuator mounted to the housing and being movable relative to the disk pack, the actuator having a suspension for reaching over the disk, the suspension having a slider coupled therewith, said slider having a read/write head element on a trailing edge (TE) portion of said slider; and
   a fluid dynamic bearing comprising:
   a thrust washer coupled with a shaft of a fluid dynamic bearing;
   at least one groove on an outward facing side of said thrust washer, said at least one groove increasing a fluid capacity of said fluid dynamic bearing without requiring a change in the size or shape of a capillary buffer of said fluid dynamic bearing;
   a capillary buffer ring portion opposite said thrust washer of said fluid dynamic bearing; and
   at least one groove on said capillary buffer ring, said at least one groove increasing the fluid capacity of said fluid dynamic bearing without requiring a change in the size or shape of a capillary buffer of said fluid dynamic bearing.

8. The hard disk drive of claim 7 wherein said at least one groove comprises:
   a plurality of radial grooves on said thrust washer.

9. The hard disk drive of claim 7 wherein said at least one groove comprises:
   a plurality of circumferential grooves on said thrust washer.

10. The hard disk drive of claim 7 wherein said fluid dynamic bearing further comprises:
    a plurality of thrust washers coupled to said shaft, said plurality of thrust washers having said at least one groove thereon.

11. The hard disk drive of claim 10 further comprising:
    a first of said plurality of thrust washers coupled to an upper portion of said shaft of said fluid dynamic bearing; and
    a second of said plurality of thrust washers coupled to a lower portion of said shaft of said fluid dynamic bearing.

12. A fluid dynamic bearing with an increased buffer volume, said fluid dynamic bearing comprising:
    a thrust washer coupled with a shaft of a fluid dynamic bearing;
    at least one groove on an outward facing side of said thrust washer, said at least one groove increasing a fluid capacity of said fluid dynamic bearing without requiring a change in the size or shape of a capillary buffer of said fluid dynamic bearing;
    a capillary buffer ring portion opposite said thrust washer of said fluid dynamic bearing; and
    at least one groove on said capillary buffer ring, said at least one groove increasing the fluid capacity of said fluid dynamic bearing without requiring a change in the size or shape of a capillary buffer of said fluid dynamic bearing.

13. The fluid dynamic bearing of claim 12 comprising:
    a plurality of radial grooves on said thrust washer.

14. The fluid dynamic bearing of claim 12 comprising:
    a plurality of circumferential grooves on said thrust washer.

15. The fluid dynamic bearing of claim 12 comprising:
    a plurality of thrust washers coupled to said shaft, said plurality of thrust washers having said at least one groove thereon.

16. The fluid dynamic bearing of claim 15 comprising:
    a first of said plurality of thrust washers coupled to an upper portion of said shaft of said fluid dynamic bearing; and
    a second of said plurality of thrust washers coupled to a lower portion of said shaft of said fluid dynamic bearing.

17. A fluid dynamic bearing with an increased buffer volume comprising:
  means for providing a thrust washer coupled with a shaft of a fluid dynamic bearing;
  means for providing at least one groove on said outward facing side of said thrust washer, said at least one groove increasing a fluid capacity of said fluid dynamic bearing without requiring a widening of a capillary buffer of said fluid dynamic bearing;
  means for providing a capillary buffer ring portion opposite said thrust washer of said fluid dynamic bearing; and
  means for providing at least one groove on said capillary buffer ring, said at least one groove increasing the fluid capacity of said fluid dynamic bearing without requiring a change in the size or shape of a capillary buffer of said fluid dynamic bearing.

* * * * *